J. BLONDIAU.
FILTER FOR WELLS AND OTHER PURPOSES.
APPLICATION FILED OCT. 22, 1909.

1,063,006.

Patented May 27, 1913.

2 SHEETS—SHEET 1.

WITNESSES:

INVENTOR,
JULES BLONDIAU.
by Attorney.

J. BLONDIAU.
FILTER FOR WELLS AND OTHER PURPOSES.
APPLICATION FILED OCT. 22, 1909.
1,063,006.
Patented May 27, 1913.
2 SHEETS—SHEET 2.
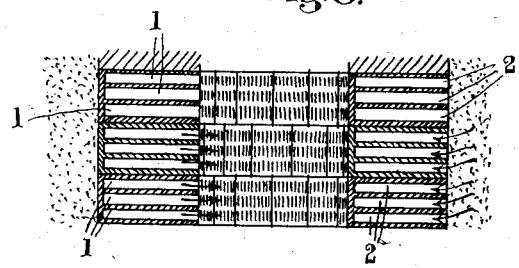
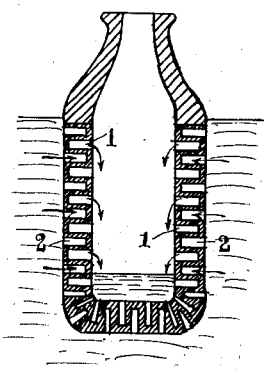
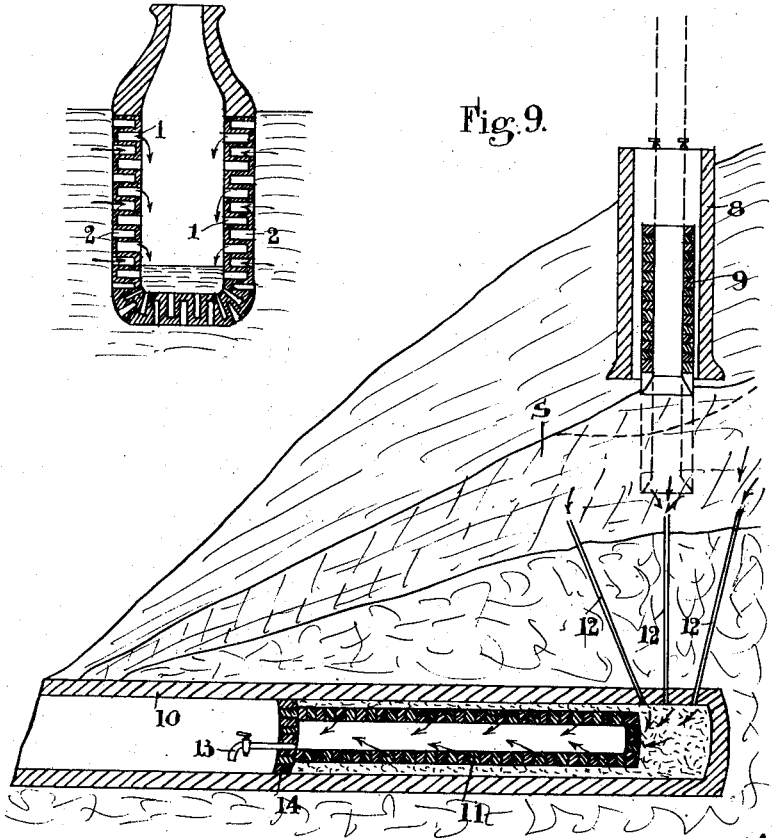
INVENTOR
JULES BLONDIAU,

UNITED STATES PATENT OFFICE.

JULES BLONDIAU, OF BRAINE-LE-COMTE, BELGIUM.

FILTER FOR WELLS AND OTHER PURPOSES.

1,063,006.  Specification of Letters Patent. Patented May 27, 1913.

Application filed October 22, 1909. Serial No. 524,011.

*To all whom it may concern:*

Be it known that I, JULES BLONDIAU, a subject of the Belgian King, and residing at Braine-le-Comte, Belgium, have invented new and useful Improvements in Filters for Wells and other Purposes; and I do hereby declare the following to be a full, clear, and exact description of the same.

My present invention relates to filters and has more particularly for its objects to provide filtering devices made of the form of stones or bricks, provided with one or a plurality of series of inner parallel passages, extending in the direction of the passage of the water, and which are alternately open at the side through which enters the water and closed at the opposite end, and open at the side through which the filtered water is discharged and closed at the opposite side.

The objects of my novel filtering devices are to obtain a comparatively large filtering surface in a comparatively compact device, whereby the water may be filtered very slowly, and to allow of the construction of filtering Artesian wells in ground with water-bearing strata and particularly in quicksand.

Figure 1:
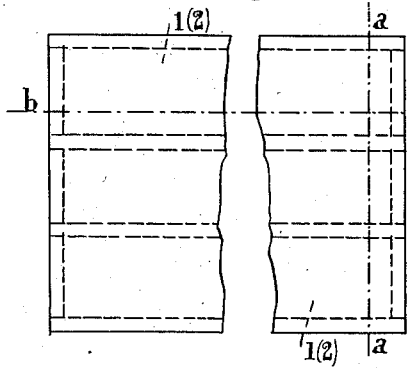
Figure 2:
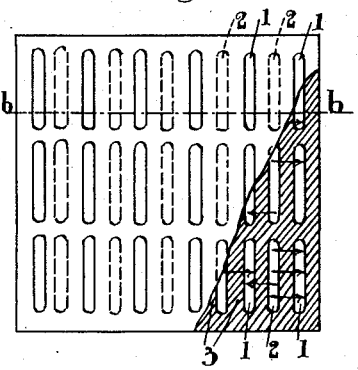
Figure 3:
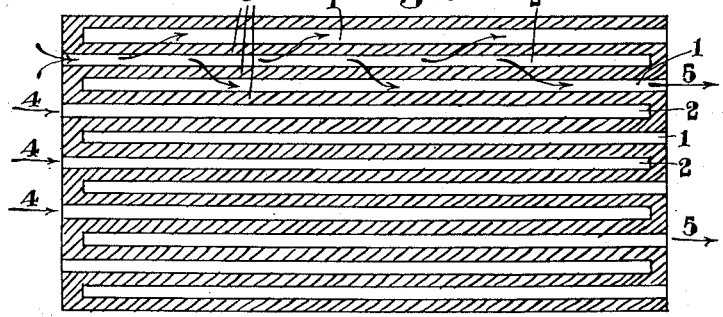
Figure 4:
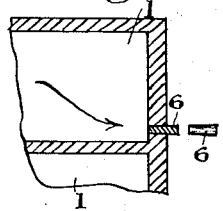
Figure 5:
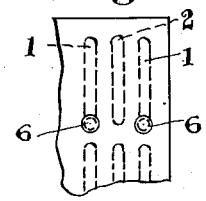
Figure 6:
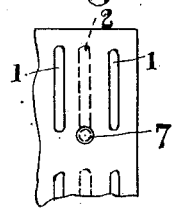
Figure 7:
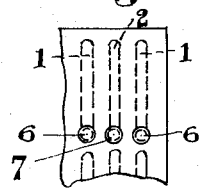

With these and other objects in view, my invention consists of the construction, arrangement and combination of parts, fully described and claimed hereinafter and illustrated in the accompanying drawings, wherein:

Figure 1 is a side elevation of my improved filtering brick; Fig. 2 is an end view of same, partly shown in section which is taken on line *a—a* of Fig. 1; Fig. 3 shows a horizontal longitudinal section on line *b—b* of Fig. 1; Fig. 4 is a fragmentary vertical longitudinal section of a filtering block, the discharge openings of which are capable of being closed for stopping the filtering; Fig. 5 is a fragmentary end elevation of same; Fig. 6 is a fragmentary end elevation of a filtering brick, the filtering conduits of which are provided with removable stoppers for cleaning purposes; Fig. 7 is a fragmentary end elevation of a filtering brick, all the conduits of which are provided with removable stoppers; Fig. 8 shows a vertical section of the lower part of a filtering well, constructed by means of filtering bricks of my invention; Fig. 9 illustrates the use of my filtering bricks in vertical walls and horizontal galleries constructed in quicksand, and Fig. 10 shows a filter made of the form of a bottle for domestic purposes.

As shown in Figs. 1, 2, 3 of the drawings, the filtering bricks of my invention are preferably made of rectangular form and square cross-section and provided with three or any desired number of horizontal series of parallel conduits 1, 2, which at one end of the brick are alternately open and closed and at the opposite end of the brick alternately closed and open, so that said conduits are merely in communication with each other through the porosity of the partitions 3. The water to be filtered which flows to the brick in the direction of the arrow 4, enters the conduits 2 and is then caused to flow through the partitions 3 before it is discharged through the conduits 1 in the direction of the arrows 5 (Fig. 3).

It will be easily understood that the water will be perfectly filtered by its passage through the partitions 3. Owing to the arrangement of the conduits 1, 2 in the interior of the brick, I obtain a considerable filtering surface under a compact volume, so that the water is filtered very slowly for a determinate delivery. The partitions 3 between the conduits 1, 2 may be made very thin owing to their little height, without exposing them to danger of being broken by the pressure of the water. For this reason, I may provide a comparatively small filter with a very considerable number of conduits 1, 2 for the purpose of obtaining a large filtering surface.

In certain cases and particularly for sinking filtering wells, it is desirable to temporarily stop the filtering of water. To this end, the outlets of the conduits 1 may be closed by means of a suitable stopper 6 (Figs. 4 and 5), and in these cases the said outlets are preferably made a little smaller, as shown. On the other hand, the closed ends of the conduits 2 through which the water is introduced, may be provided with openings (Fig. 6) which are normally closed by means of stoppers 7, after the removal of which said conduits may be easily cleaned. Of course, all the conduits 1, 2 may be provided with removable stoppers 6, 7 as shown in Fig. 7 for the purpose of stopping the filtering and cleaning the conduits respectively.

Fig. 8 illustrates the arrangement of the filtering bricks above described in the lower part of an ordinary filtering well, while the upper portion of Fig. 9 shows a vertical section through a well sunk into water-bearing quicksand. This latter well is composed of a shaft 8 made of ordinary brickwork in the solid ground and within which a second filtering shaft 9 is built up by means of my improved filtering bricks. After said shaft 9 is completely dried, it will be sunk through the water-bearing stratum S to the solid stratum below the latter. During the sinking of the shaft 9, the conduits 1 (Figs. 4 and 5) will be closed in order to prevent water from being discharged into said shaft. After the complete sinking of the latter, sand and the like will be removed from the same whereupon the stoppers 6 are removed from the conduits 1 for allowing of the discharge of filtered water.

The lower portion of Fig. 9 shows a section of a horizontal filtering gallery, composed of a gallery 10 made of ordinary brickwork in the solid ground and containing an inner gallery 11 made of filtering bricks of the described construction. The water-bearing stratum S located above the solid ground is connected with the filtering gallery through the agency of holes or passages 12, 12, bored through the solid ground as shown.

By means of my improved filtering bricks, I may construct or manufacture filters of any kind and form for filtering any desired liquids and gases by suitably determining the sizes of said bricks and the thickness and porosity of the partitions thereof. For instance, I may manufacture filtering bottles (Fig. 10) in the walls of which I arrange the conduits 1, 2 alternately side by side and one above the other, so that it is sufficient to immerse the bottle into the water for filtering the same and filling the bottle with filtered water.

Having fully described my invention, what I claim and desire to secure by Letters Patent is:

A device for filtering, comprising a rectangular block having opposite inlet and discharge faces and provided with slightly spaced flat horizontally lying channels of vertically elongated cross-section extending perpendicularly and nearly connecting said faces, every alternate conduit being a filtering conduit and opening through said inlet face and being closed at the opposite end, the remaining conduits being discharge conduits and opening through the discharge face and closed at the end nearest the inlet face, all of the faces except the inlet and outlet faces being imperforate, means directly fitting in the open ends of the discharge conduits for temporarily closing the same, and means at the closed ends of the filtering conduits for permitting the filtering conduits to be cleaned from the discharge end of the device.

In testimony whereof, I have signed my name to this specification in the presence of two subscribing witnesses.

JULES BLONDIAU.

Witnesses:
CHARLES HOWARD,
GREGORY PHELAN.